United States Patent
Degli-Esposti

(10) Patent No.: US 10,014,913 B1
(45) Date of Patent: *Jul. 3, 2018

(54) ESTIMATING THE LOCATION OF A WIRELESS TERMINAL IN THE PURVIEW OF A DISTRIBUTED-ANTENNA SYSTEM

(71) Applicant: Polaris Wireless, Inc., Mountain View, CA (US)

(72) Inventor: Vittorio Degli-Esposti, Sasso Marconi (IT)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/658,225

(22) Filed: Jul. 24, 2017

(51) Int. Cl.
*H04W 36/04* (2009.01)
*H04B 7/04* (2017.01)
*H04W 64/00* (2009.01)
*H04W 24/08* (2009.01)
*H01Q 21/00* (2006.01)

(52) U.S. Cl.
CPC ........... *H04B 7/04* (2013.01); *H01Q 21/0006* (2013.01); *H04W 24/08* (2013.01); *H04W 64/00* (2013.01)

(58) Field of Classification Search
CPC ..... H04W 40/02; H04W 40/06; H04W 80/00; H04W 88/00; H04W 88/02; H04W 88/06; H04W 88/08; H04W 76/40; H04W 76/00; H04W 64/00; H04W 4/029; H04W 4/023; H04W 36/04; H04W 48/18; H04W 40/20; H04W 40/04; H04W 40/00; H04W 40/08; H04W 40/12; H04W 16/00; H04W 16/18; H04W 4/06; H04W 84/045; H01Q 3/2605; H01Q 3/2617; H01Q 3/2623; H01Q 3/2658; H01Q 3/2635; H01Q 21/00; H01Q 3/00; H04B 7/04; H04B 1/005; H04B 1/18; H04B 7/02; H04B 7/0404; H04B 7/0408; H04Q 1/00
See application file for complete search history.

(56) References Cited

U.S. PATENT DOCUMENTS

| | | | | |
|---|---|---|---|---|
| 4,166,274 | A * | 8/1979 | Reudink | H01Q 3/2652 342/376 |
| 6,385,464 | B1* | 5/2002 | Narita | H04B 7/0602 455/561 |
| 6,590,532 | B1* | 7/2003 | Ogawa | H01Q 1/246 342/378 |
| 2001/0005685 | A1* | 6/2001 | Nishimori | H01Q 3/2605 455/562.1 |
| 2002/0093934 | A1* | 7/2002 | Bolgiano | G01S 5/14 370/342 |
| 2005/0003828 | A1* | 1/2005 | Sugar | H04W 24/00 455/456.1 |
| 2006/0078066 | A1* | 4/2006 | Yun | H04B 7/068 375/299 |
| 2010/0142481 | A1* | 6/2010 | Lim | H04W 72/005 370/331 |

(Continued)

*Primary Examiner* — Meless Zewdu
(74) *Attorney, Agent, or Firm* — McGeary Cukor LLC; Jason Paul DeMont; Kenneth Ottesen

(57) ABSTRACT

A wireless telecommunications system that employs a distributed-antenna system is described in which different combinations of radio signals are assigned to antennas so as to facilitate locating a wireless terminal based on the identity and the relative signal strength of the radio signals it receives above a signal-strength threshold.

13 Claims, 17 Drawing Sheets

(56) References Cited

U.S. PATENT DOCUMENTS

| | | | |
|---|---|---|---|
| 2011/0019723 A1* | 1/2011 | Lerner | H04B 7/0871 375/219 |
| 2017/0192082 A1* | 7/2017 | Zhang | G01S 5/0268 |
| 2017/0195936 A1* | 7/2017 | Want | H04W 36/32 |
| 2017/0271781 A1* | 9/2017 | Gururaja Rao | H01Q 21/22 |

\* cited by examiner

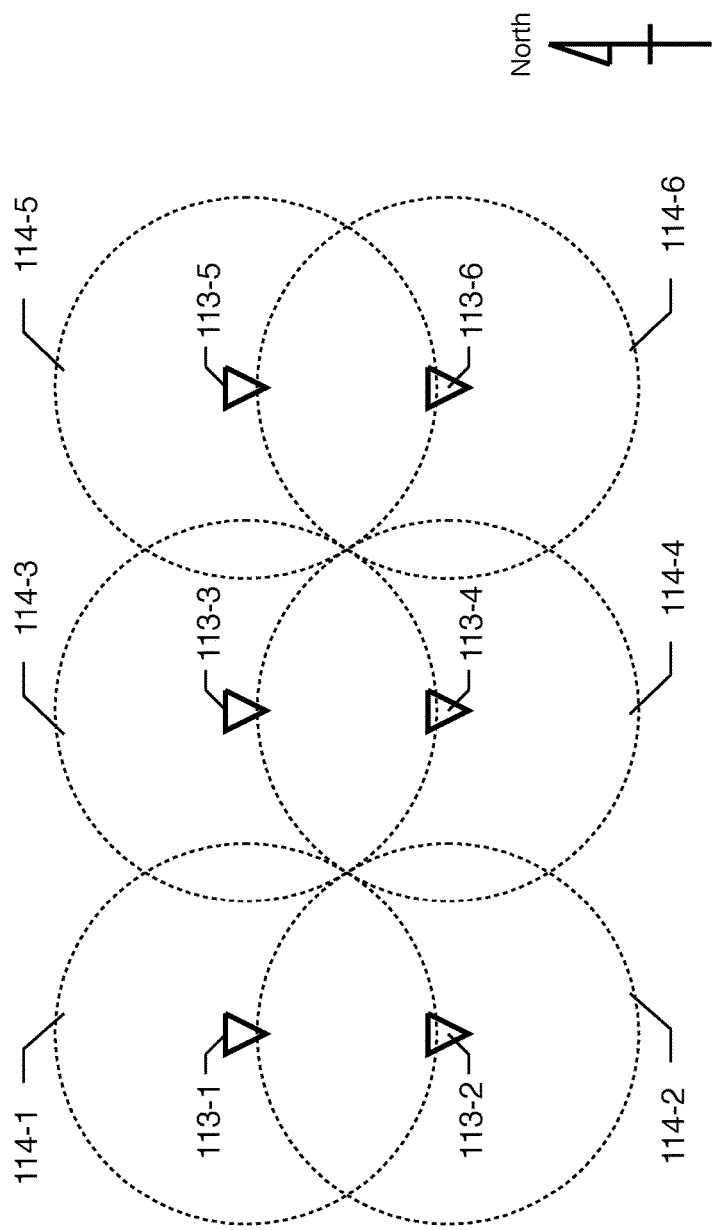

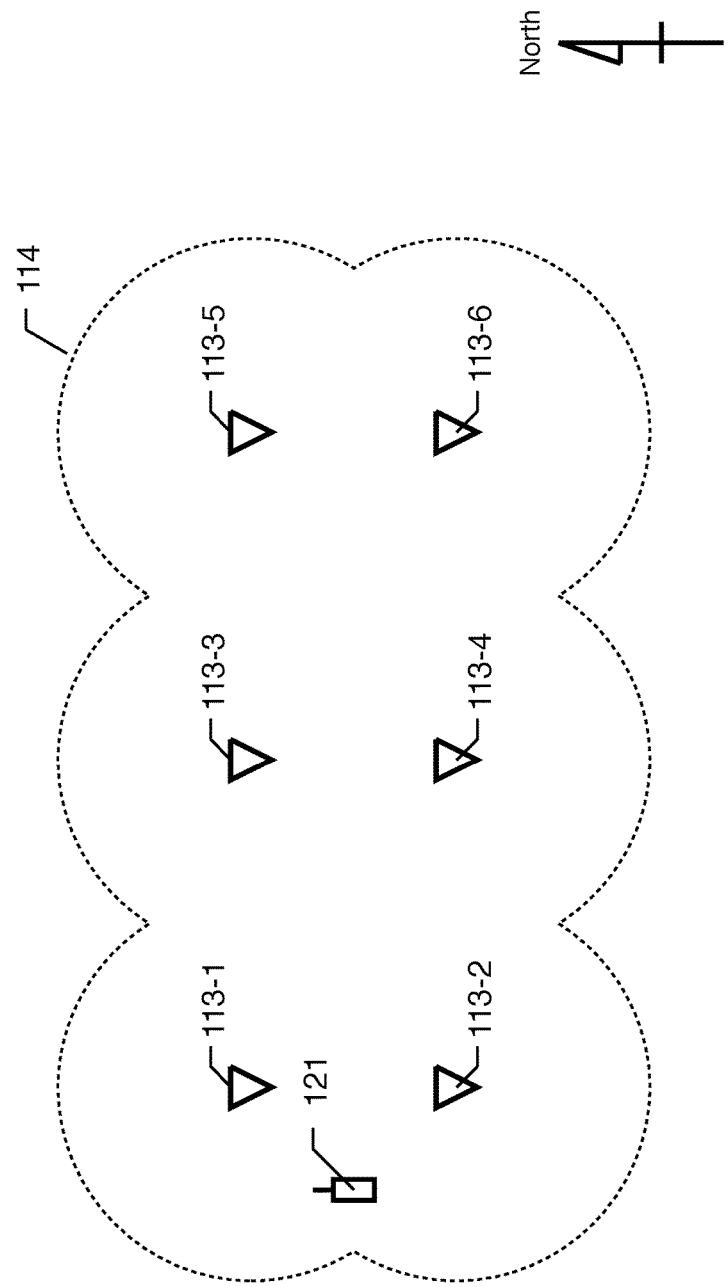
Figure 1C (Prior Art) Map View of the Service Area Served By Radio Signals α, β, and γ in Wireless Telecommunications System 100

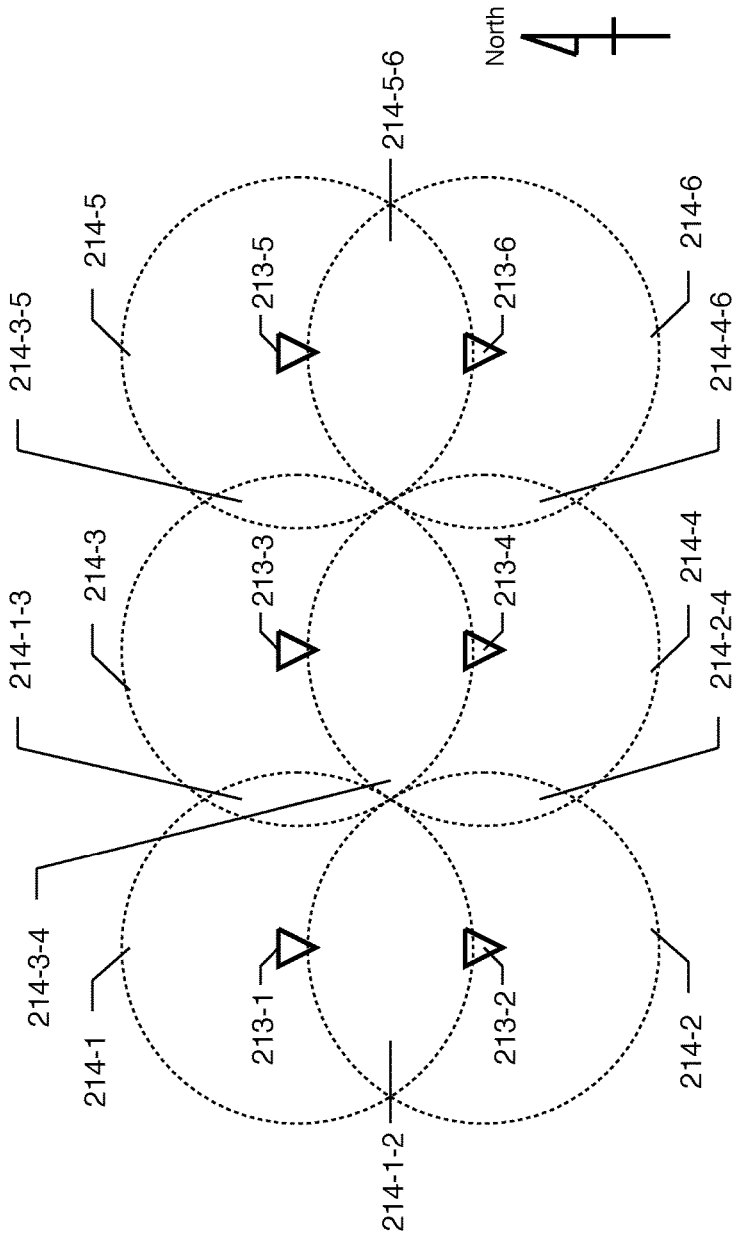

Figure 5 Wireless Telecommunications System 300 (map view) - Alternative Spatial Position of Antennas

ESTIMATING THE LOCATION OF A WIRELESS TERMINAL IN THE PURVIEW OF A DISTRIBUTED-ANTENNA SYSTEM

STATEMENT OF RELATED APPLICATIONS

This application is related to U.S. patent application Ser. No. 15/607,686, entitled "Estimating the Location of a Wireless Terminal in the Purview of a Distributed-Antenna System," which is currently pending.

FIELD OF THE INVENTION

The present invention relates to wireless telecommunications in general, and, more particularly, to a wireless telecommunications system that employs a distributed-antenna system.

BACKGROUND OF THE INVENTION

A wireless telecommunications system provides telecommunications service to one or more wireless terminals in a three-dimensional spatial region. Some wireless telecommunications systems transmit each distinguishable signal from only one antenna. In contrast, some wireless telecommunications systems transmit an identical signal from two or more spatially-separated antennas.

Two of the types of systems are: phased-array antenna systems and distributed-antenna systems. In a phased-array antenna system, the phase of each signal at each antenna is coordinated in order to precisely affect how the signal, as radiated from each antenna, interferes with itself. In contrast, a distributed-antenna system radiates an identical signal from two or more spatially-distinct antennas in order to tailor the effective service area of the system but there is no attempt to affect the how the signal, as radiated from each antenna, interferes with itself.

SUMMARY OF THE INVENTION

The present invention provides a mechanism for estimating the location of a wireless terminal in the purview of a distributed-antenna system without some of the costs and disadvantages for doing so in the prior art.

For example, when a wireless telecommunications system comprises two or more antenna, there will be some areas where the signals from only one antenna will be received (above a signal-strength threshold). These are called non-overlapping service areas. In addition, there might be some areas where the signals from two or more antennas will be received (above a signal-strength threshold). These are called overlapping service areas. The number, shape, and character of each non-overlapping and overlapping service area in any particular system is dependent on a number of factors that include:
  i. the number and location of the system's antennas,
  ii. the power with which each radio signal is transmitted at each antenna,
  iii. the frequency of each radio signal, and
  iv. the nature of the radio-frequency environment, which reflects, refracts, and absorbs each radio signal.

In accordance with the illustrative embodiments, different combinations of radio signals are radiated from different antennas (or combinations of antennas) so that the radio signals received (above a signal-strength threshold) in at least some of the non-overlapping and overlapping services areas are different than the radio signals received (above a signal-strength threshold) in some of the other service areas. This enables the location of a wireless terminal to be estimated based on the identity of the signal(s) that the wireless terminal receives (above a signal-strength threshold) and on the identity of the signal(s) that the wireless terminal does not receive (above a signal-strength threshold). In other words, various overlapping and non-overlapping service areas in the purview of the distributed antenna system are identifiable based on the pattern of distinguishable radio signals that the wireless terminal can—and cannot—receive (above a signal-strength threshold).

In some cases, however, there might be non-contiguous services areas in which the wireless terminal receives the same signals (above the signal-strength threshold) and does not receive other signals (above the signal-strength threshold), and, therefore, the location of the wireless terminal cannot be reasonably and unambiguously estimated based solely on the identity of the signals. Therefore, each illustrative embodiment of the present invention further uses the relative locally-averaged signal strength of the signals that it receives (above the signal-strength threshold) to reasonably disambiguate locations that are otherwise ambiguous. The locally-averaged received signal strength is advantageously measured over at least two or three wavelengths—whether from the movement of the wireless terminal or movement in the RF environment—and mitigates the effects of destructive and constructive interference.

Because the number of antennas—and their respective locations—can vary, it is advantageous to consider the advantages and disadvantages of radiating different combinations of signals from each antenna to determine which assignments of signals to antennas is most desirable in a particular circumstance. In general, however, it will be clear to those skilled in the art, after reading this disclosure, that some patterns of assignments of signals to antennas are particularly advantageous.

BRIEF DESCRIPTION OF THE DRAWINGS

FIG. 1B depicts a map view of the service area of each antenna in wireless telecommunications system 100.

FIG. 1C depicts a map view of the service area of radio signals $\alpha$, $\beta$, and $\gamma$ in wireless telecommunications system 100.

FIG. 2B depicts a map view of the service area of each antenna in wireless telecommunications system 200.

DETAILED DESCRIPTION

Figure 1A:
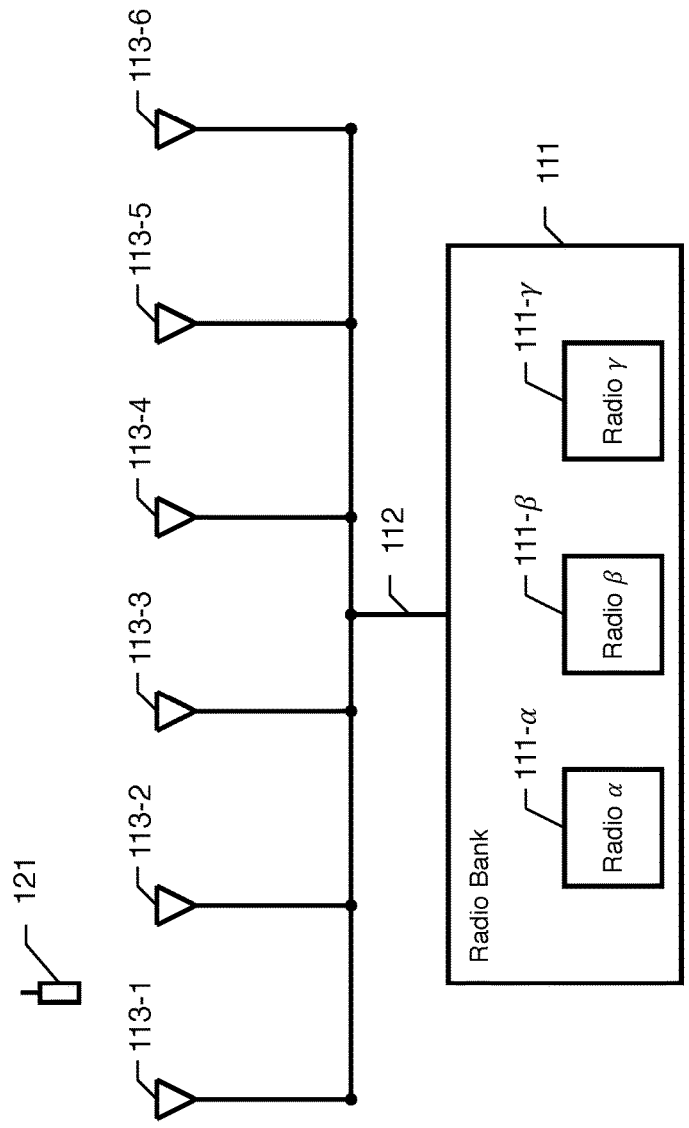
FIG. 1A depicts a schematic diagram of the salient components of wireless telecommunications system 100 in the prior art.

FIG. 1A depicts a schematic diagram of the salient components of wireless telecommunications system 100 in the prior art, which provides telecommunications service to a plurality of wireless terminals that are within the geographic scope one or more of the antennas of system 100. Wireless telecommunications system 100 comprises: radio bank 111, wireline assembly 112, and distributed-antenna system 113.

Radio bank 111 comprises three radios, each with its own distinct hardware: radio 111-α, radio 111-β, and radio 111-γ. Radio 111-α generates modulated radio-frequency carrier signal α; radio 111-β generates modulated radio-frequency carrier signal β, and radio 111-γ generates modulated radio-frequency carrier signal γ. The structure of modulated radio-frequency carrier signal α, modulated radio-frequency carrier signal β, and modulated radio-frequency carrier signal γ is such that a wireless terminal can distinguish each signal from the other signals.

Distributed-antenna system 113 comprises antennas 113-1 through 113-6. Each of antennas 113-1 through 113-6 is more than one wavelength of signals α, β, and γ apart from each other (as depicted in FIG. 1B). Furthermore, the phase of the signals radiated by each of antennas 113-1 through 113-6 is uncoordinated (i.e., distributed-antenna system 113 is not a phased-array). And still furthermore, each of each antennas 113-1 through 113-6 radiates modulated radio-frequency carrier signals α, β, and γ, with the same signal strength.

Wireline assembly 112 comprises the cabling and associated hardware that transports modulated radio-frequency carrier signals α, β, and γ from radio bank 111 to each of antennas 113-1 through 113-6.

FIG. 1B depicts a map view of the service area of each antenna in wireless telecommunications system 100. In particular, the service area of the signal radiated by antenna 113-$i$ is depicted in FIG. 1B as geographic region 114-$i$, where $i \in \{1, 2, 3, 4, 5, 6\}$. Because each of antennas 113-1 through 113-6 radiates modulated radio-frequency carrier signals α, β, and γ, all three signals have a signal strength above a signal-strength threshold at each location within the respective service area. In other words, if a wireless terminal receives any one of signals α, β, and γ above the signal-strength threshold at any location, then the wireless terminal will also receive the other signals above that signal-strength threshold. This fact eliminates the possibility of estimating the location of a wireless terminal within service area 114 based on the identity of the signals that it receives above the signal-strength threshold. This is depicted in FIG. 1C, in which all of service area 114 is served by the same combination of signals—radio signals α, β, and γ.

Figure 2A:
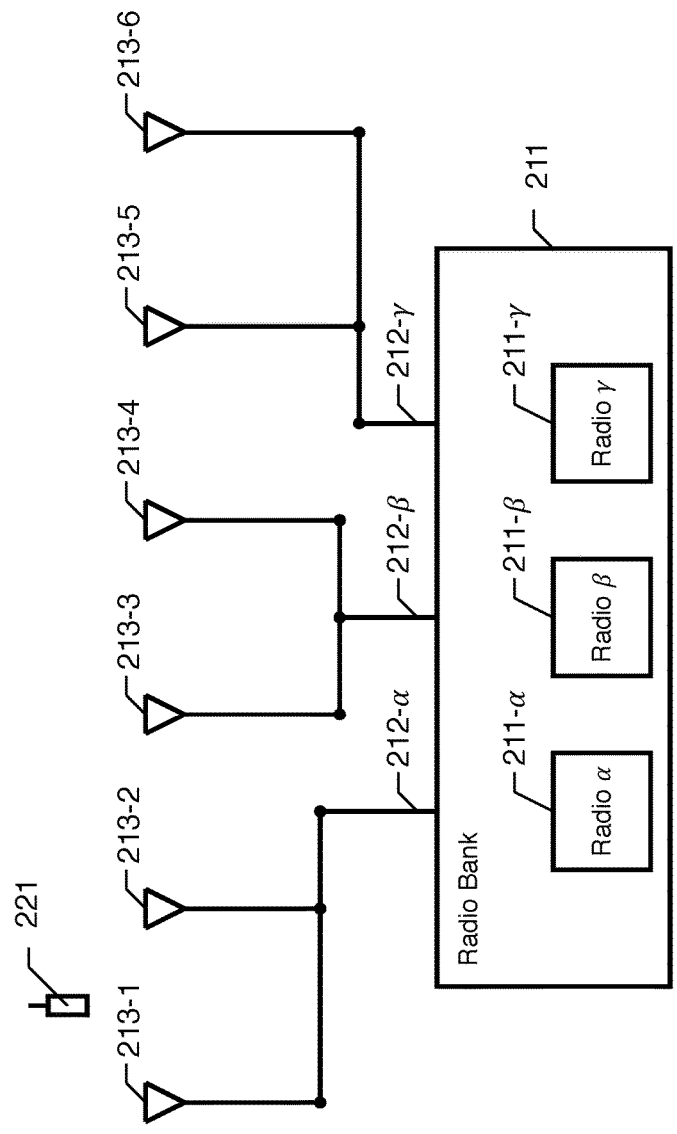
FIG. 2A depicts a schematic diagram of the salient components of wireless telecommunications system 200 in accordance with the first illustrative embodiment of the present invention.

FIG. 2A depicts a schematic diagram of the salient components of wireless telecommunications system 200 in accordance with the first illustrative embodiment of the present invention. Wireless telecommunications system 200 provides telecommunications service to a plurality of wireless terminals that are within the geographic scope of one or more antennas of system 200. Wireless telecommunications system 200 comprises: radio bank 211, wireline assemblies 212-α, 212-β, and 212-γ, and distributed-antenna system 213.

Radio bank 211 is identical to radio bank 111 in the prior art and comprises three radios, each with its own distinct hardware: radio 211-α, radio 211-β, and radio 211-γ. Radio 211-α generates modulated radio-frequency carrier signal α; radio 211-β generates modulated radio-frequency carrier signal β, and radio 211-γ generates modulated radio-frequency carrier signal γ. The structure of modulated radio-frequency carrier signal α, modulated radio-frequency carrier signal β, and modulated radio-frequency carrier signal γ is such that a wireless terminal can distinguish each signal from the other signals.

In some alternative embodiments of the present invention, each radio in radio bank 211 does not comprise distinct hardware but rather is a "software-defined" radio in a "block" or software-defined radio bank. In any case, it will be clear to those skilled in the art how to make and use radio 211-α, radio 211-β, and radio 211-γ.

In accordance with the first illustrative embodiment, radio bank 211 generates three radio signals but it will be clear to those skilled in the art, after reading this disclosure, how to make and use alternative embodiments of the present invention that generate any number of radio signals, with either distinct hardware, a software-defined radio, or any combination of the two.

Distributed-antenna system 213 is identical to distributed-antenna system 113 in the prior art and comprises antennas 213-1 through 213-6. Each of antennas 213-1 through 213-6 is more than one wavelength of signals α, β and γ from each other (as depicted in FIG. 2B). Furthermore, the phase of the signals radiated by each of antennas 213-1 through 213-6 is uncoordinated (i.e., distributed-antenna system 213 is not a phased-array). And still furthermore, each of each of antennas 213-1 through 213-6 radiates modulated radio-frequency carrier signals α, β, and γ, with the same signal strength. It will be clear to those skilled in the art, however, after reading this disclosure, how to make and use alternative embodiments of the present invention in which two or more signals are radiated with a different signal strength.

FIG. 2B depicts a map view of the service area of each antenna in wireless telecommunications system 200. The service area of antenna 113-i is depicted in FIG. 2B as geographic region 214-i, where i ∈{1-6}. For pedagogical reasons, the service area of each antenna in the illustrative embodiments is depicted as approximately round and centered at the antenna. It will be clear to those skilled in the art, however, after reading this disclosure, how to make and use alternative embodiments of the present invention in which the service area of each antenna has any shape and spatial relationship to its corresponding antenna (e.g., in the case of directional or sectorized antennas, etc.).

It can be seen in FIG. 2B that the service areas of individual antennas partially overlap, which is denoted by geographic region 214-i-j that is the overlap of region 214-i and 214-j, wherein j∈{1-6}.

Although distributed-antenna system 213 comprises six antennas, it will be clear to those skilled in the art, after reading this disclosure, how to make and use alternative embodiments of the present invention that comprise any number of antennas. Furthermore, it will be clear to those skilled in the art, after reading this disclosure, how to make and use alternative embodiments of the present invention in which the antennas have any spatial relationship to each other.

Wireline assembly 212-α comprises the cabling that transports modulated radio-frequency carrier signal α from radio 211-α to antennas 213-1 and 213-2; wireline assembly 212-β comprises the cabling that transports modulated radio-frequency carrier signal β from radio 211-β to antennas 213-3 and 213-4, and wireline assembly 212-γ comprises the cabling that transports modulated radio-frequency carrier signal 211-γ from radio γ to antennas 213-5 and 213-6. It will be clear to those skilled in the art how to make and use wireline assemblies 212-α, 212-β, and 212-γ.

Figure 2C:
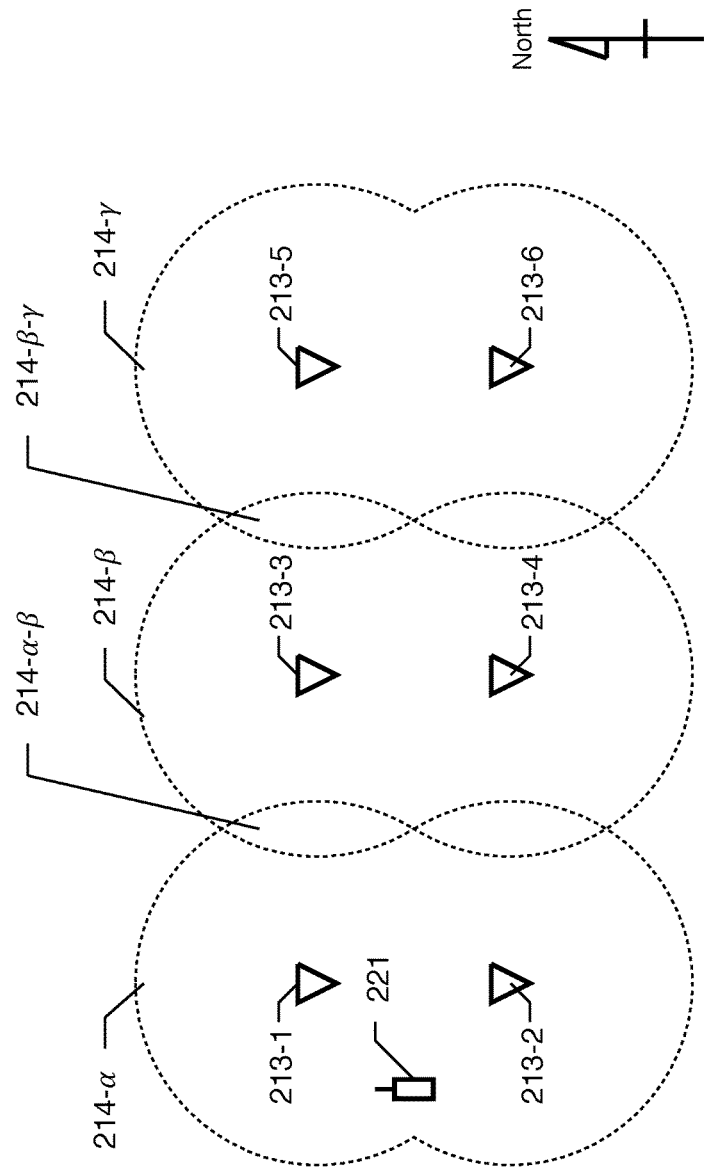
FIG. 2C depicts a map view of the service area served by each radio signal and each combination of radio signals in wireless telecommunications system 200 with respect to the location of antennas 213-1 through 213-6 and wireless terminal 221.

FIG. 2C depicts a map view of the service area served by each radio signal and each combination of radio signals in wireless telecommunications system 200 with respect to the location of antennas 213-1 through 213-6 and wireless terminal 221.

Signal α is radiated only by antennas 213-1 and 213-2 and has a signal strength above a signal-strength threshold in service areas 214-α and 214-α-β. Signal β is radiated only by antennas 213-3 and 213-4 and has a signal strength above the signal-strength threshold in service areas 214-α-β, 214-β, and 214-β-γ. Signal γ is radiated only by antennas 213-5 and 213-6 and has a signal strength above the signal-strength threshold in service areas 214-γ and 214-β-γ. There is no area that is served by both signal α and signal γ (i.e., service area 214-α does not intersect service area 214-γ).

Wireless telecommunications system 200 is advantageous over system 100 in that it enables the location of wireless terminal 221 to be estimated based on the identity of the signal or signals that wireless terminal 221 receives—and does not receive—above the signal-strength threshold. For example, if a wireless terminal receives signal α with a signal strength above the signal-strength threshold—but does not receive signal β or signal γ with a signal strength above the signal-strength threshold—then it is reasonable to estimate the location of the wireless terminal as being within service area 214-α. Analogously, if a wireless terminal receives signal β and signal γ with a signal strength above a signal-strength threshold—but does not receive signal α with a signal strength above that signal-strength threshold—then it is reasonable to estimate the location of the wireless terminal as being within service area 214-β-γ.

In contrast, wireless telecommunications system 200 is disadvantageous over system 100 in that it offers less service capacity to each location within its purview. In other words, wireless telecommunications system 100 offers three signals of the service capacity to each location within service area 114, whereas system 200 offers only—depending on the location—one or two signals to a given service area. In some situations, the ability of system 200 to locate a wireless terminal outweighs the disadvantage of lower average service capacity per location. In some other situations, the ability of a system to offer higher service capacity per location outweighs the ability of the system to locate a wireless terminal based on the identity of the signals that the wireless terminal receives above the signal-strength threshold.

Figure 3A:
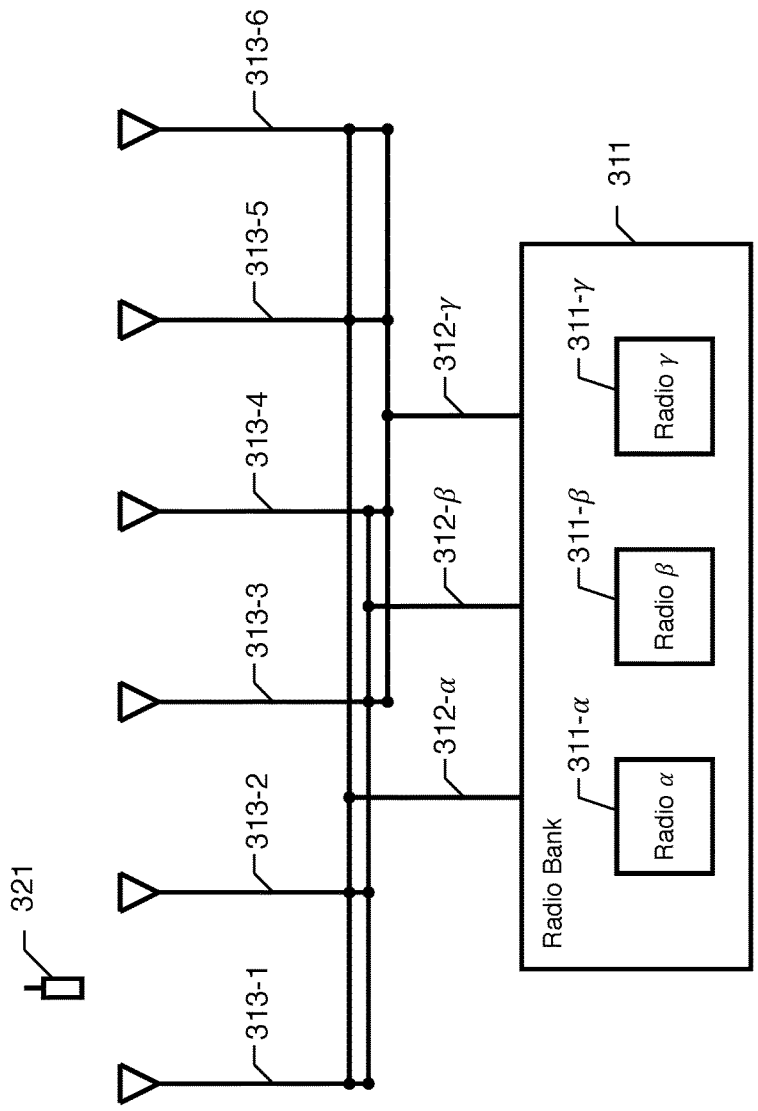
FIG. 3A depicts a schematic diagram of the salient components of wireless telecommunications system 300 in accordance with the second illustrative embodiment of the present invention.
Figure 3B:
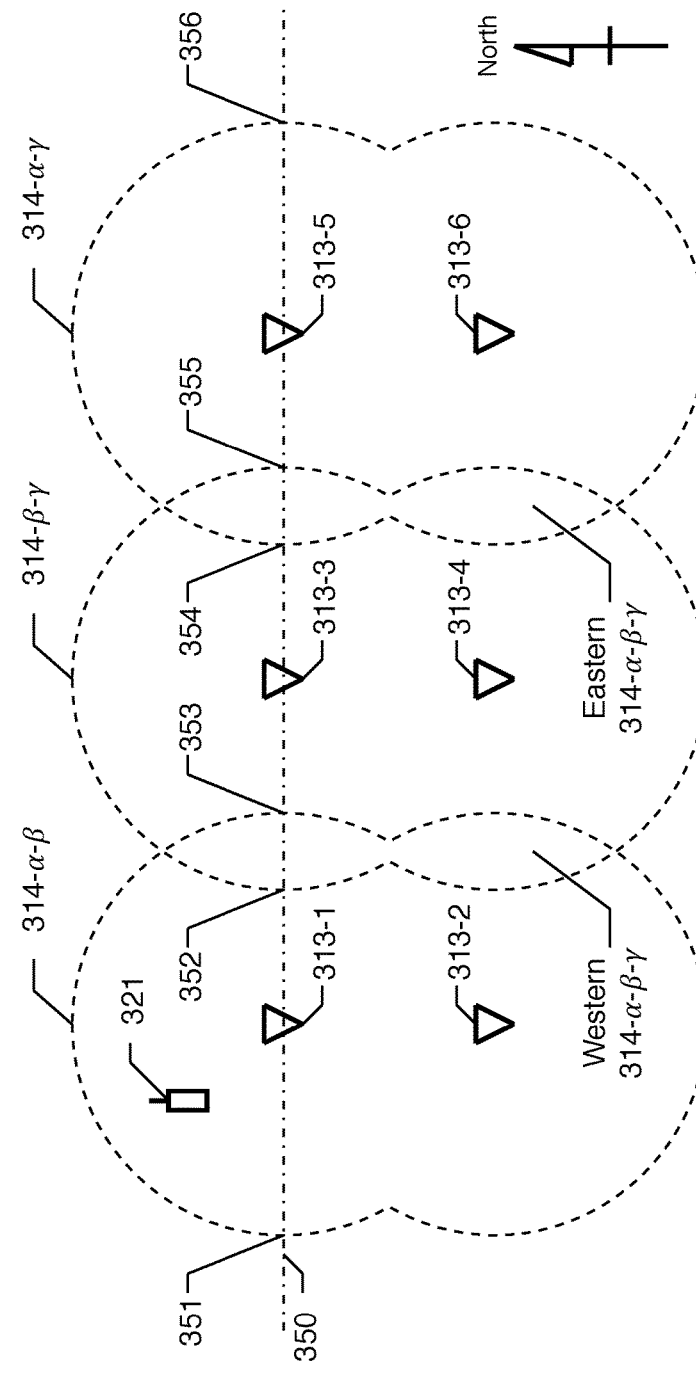
FIG. 3B depicts a map view of the service area served by each radio signal and each combination of radio signals in wireless telecommunications system 300 with respect to the location of antennas 313-1 through 313-6 and wireless terminal 321.
Figure 5:
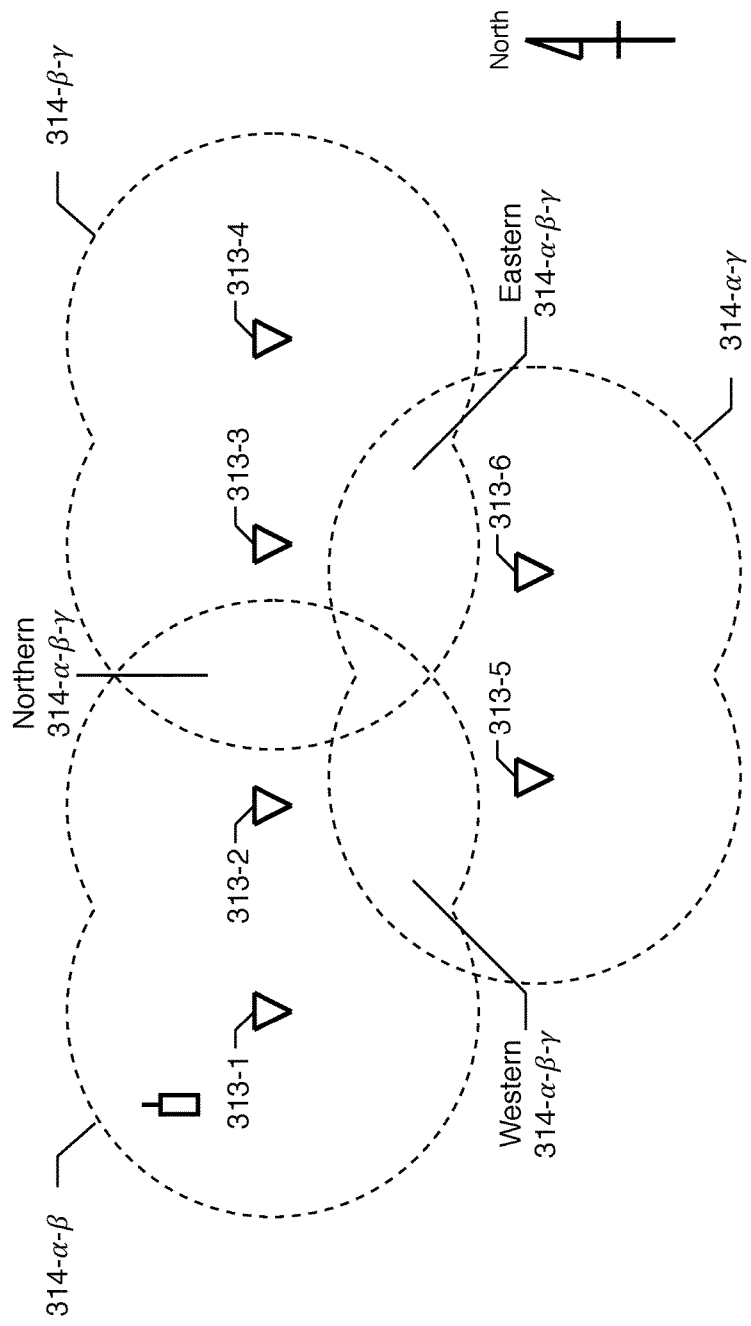
FIG. 5 depicts a map view of the service area served by each radio signal and each combination of radio signals in an alternative embodiment wireless telecommunications system 300 with respect to the location of antennas 313-1 through 313-6 and wireless terminal 321.

FIG. 3A depicts a schematic diagram of the salient components of wireless telecommunications system 300 in accordance with the second illustrative embodiment of the present invention. Wireless telecommunications system 300 provides telecommunications service to the wireless terminals (e.g., wireless terminal 321) within service area 314 (as depicted in FIGS. 3B and 5). Wireless telecommunication system comprises: radio bank 311, wireline assemblies 312-α, 312-β, and 312-γ, and distributed-antenna system 313.

Radio bank 311 comprises three radios, each with its own distinct hardware: radio 311-α, radio 311-β, and radio 311-γ. Radio 311-α generates modulated radio-frequency carrier signal α. Similarly, radio 311-β generates modulated radio-frequency carrier signal β, and radio 311-γ generates modulated radio-frequency carrier signal γ. The structure of modulated radio-frequency carrier signal α, modulated radio-frequency carrier signal β, and modulated radio-frequency carrier signal γ is such that a wireless terminal can recognize and distinguish each signal. For example, the signals can be distinguishable by frequency (e.g., frequency-division multiplexing, etc.), time (e.g., time-division multiplexing, etc.), code (e.g., code-division multiplexing, etc.) or by radio channel. It will be clear to those skilled in the art, after reading this disclosure, how to make radio-frequency carrier signal α, radio-frequency carrier signal β, and radio-frequency carrier signal γ.

In some alternative embodiments of the present invention, each radio in radio bank 311 does not comprise distinct hardware but rather is a "software-defined" radio in a "block" or software-defined radio bank. In any case, it will be clear to those skilled in the art how to make and use radio 311-α, radio 311-β, and radio 311-γ.

Distributed-antenna system 313 comprises antennas 313-1 through 313-6. Each of antennas 313-1 through 313-6 is more than one wavelength of signals α, β, and γ from each other (as depicted in FIGS. 3B and 5). Furthermore, the phase of the signals radiated by each of antennas 313-1 through 313-6 is uncoordinated (i.e., distributed-antenna system 313 is not a phased-array). And still furthermore, each of each of antennas 313-1 through 313-6 radiates modulated radio-frequency carrier signals α, β, and γ, with the same signal strength. It will be clear to those skilled in the art how to make and use antennas 313-1 through 313-6 in antenna system 313.

Wireline assembly 312-α transports modulated radio-frequency carrier signal α from radio 311-α to antennas 313-1, 313-2, 313-5, and 313-6; wireline assembly 312-β transports modulated radio-frequency carrier signal β from radio 311-β to antennas 313-1, 313-2, 313-3, and 313-4, and wireline assembly 312-γ transports modulated radio-frequency carrier signal γ from radio 311-γ to antennas 313-3, 313-4, 313-5, and 313-6. It will be clear to those skilled in the art how to make and use wireline assemblies 312-α, 312-β, and 312-γ.

FIG. 3B depicts a map view of the service area served by each radio signal and each combination of radio signals in wireless telecommunications system 300 with respect to the location of antennas 313-1 through 313-6 and wireless terminal 321.

Signal α is radiated only by antennas 313-1, 313-2, 313-5, and 313-6 and has a signal strength above a signal-strength threshold in service areas 314-α-β, Western 314-α-β-γ, Eastern 314-α-β-γ, and 314-α-γ. Signal β is radiated only by antennas 313-1, 313-2, 313-3, and 313-4 and has a signal strength above the signal-strength threshold in service areas 314-α-β, Western 314-α-β-γ, Eastern 314-α-β-γ, and 314-β-γ. Signal γ is radiated only by antennas 313-3, 313-4, 313-5, and 313-6 and has a signal strength above a signal-strength threshold in service areas 314-α-γ, Western 314-α-β-γ, Eastern 314-α-β-γ, and 314-β-γ.

Wireless telecommunications system 300 is advantageous over system 100 in that the location of a wireless terminal can be estimated based on the following three factors:
  (i) the identity of the signal or signals that it receives above the signal-strength threshold, and
  (ii) the identity of the signal or signals that it does not receive above the signal-strength threshold, and
  (iii) the relative signal strength of the signals that is receives above the signal-strength threshold.

In some cases, the location of the wireless terminal can be unambiguously estimated based solely on factors (i) and (ii). For example, if a wireless terminal receives signal α and signal β with a signal strength above the signal-strength threshold, but does not receive signal γ with a signal strength above the signal-strength threshold, then it is reasonable to estimate the location of the wireless terminal as being within service area 314-α-β.

In some alternative cases, the location of the wireless terminal can be unambiguously estimated based on a combination of factors (i), (ii), and (iii). This concept is illustrated, for example, by examining what signals a wireless terminal would receive at each location along line 350 (shown in FIG. 3B). This is depicted in FIG. 4.

Figure 4:
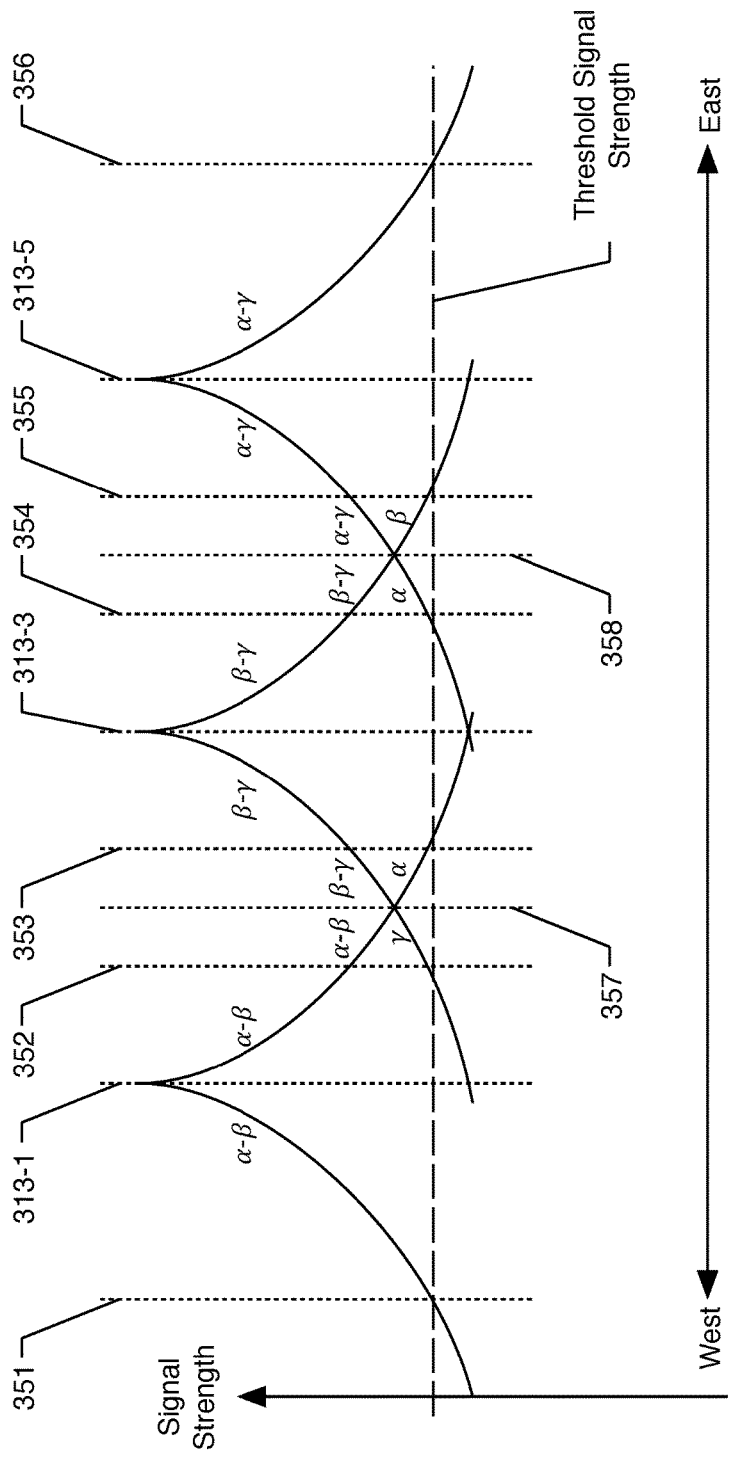
FIG. 4 depicts a graph of the relative signal strength of signals α, β, and γ as a function of location along line 350 in FIG. 3B.

FIG. 4 depicts a graph of the relative signal strength of signals α, β, and γ as a function of location along line 350 (shown in FIG. 3B).

At location 313-1, which is the location of antenna 313-1, the signal strength of signals α and β are at a maximum and they decrease in both the eastward and westward directions. At location 351 (to the west), the signal strength of signals α and β fall below a signal-strength threshold. If a signal's signal strength at a particular location is below the signal-strength threshold it is either:
  (i) not received by the wireless terminal, or
  (ii) received by the wireless terminal but treated—for the purposes of estimating the location of the wireless terminal—as if it were not received.

At location 353 (to the east), the signal strength of signal α falls below the signal-strength threshold (but the signal strength of signal β remains above the signal-strength threshold because of the energy transmitted by antenna 313-3). Therefore, if a wireless terminal receives signals α and β above the signal-strength threshold, but does not receive signal γ above the signal-strength threshold, then the location of the wireless terminal can be reasonably and unambiguously estimated to be between location 351 and location 352 (i.e., within service area 314-α-β) based solely on factors (i) and (ii).

At location 313-3, which is the location of antenna 313-3, the signal-strength of signals β and γ are at a maximum and they decrease in both the eastward and westward directions. At location 352 (to the west), the signal-strength of signal γ falls below the signal-strength threshold (but the signal-strength of signal β remains above the signal-strength threshold because of the energy transmitted by antenna 313-1). At location 355 (to the east), the signal-strength of signal β falls below the signal-strength threshold (but the signal-strength of signal γ remains above the signal-strength threshold because of the energy transmitted by antenna 313-5). Therefore, if a wireless terminal receives signals β and γ above the signal-strength threshold, but does not receive signal α above the signal-strength threshold, then the location of the wireless terminal can be reasonably and unambiguously estimated to be between location 353 and location 354 (i.e., within service area 314-β-γ) based solely on factors (i) and (ii).

At location 313-5, which is the location of antenna 313-5, the signal-strength of signals α and γ are at a maximum and they decrease in both the eastward and westward directions. At location 354 (to the west), the signal-strength of signal α falls below the signal-strength threshold (but the signal-strength of signal γ remains above the signal-strength threshold because of the energy transmitted by antenna 313-3). At location 356 (to the east), the signal-strength of signals α and γ fall below the signal-strength threshold. Therefore, if a wireless terminal receives signals α and γ above the signal-strength threshold, but does not receive signal β above the signal-strength threshold, then the location of the wireless terminal can be reasonably and unambiguously estimated to be between location 355 and location 356 (i.e., within service area 314-α-γ) based solely on factors (i) and (ii).

Between location 352 and location 353 (i.e., Western 314-α-β-γ) and between location 354 and location 355 (i.e., Eastern 314-α-β-γ), all of signals α, β, and γ are above the signal-strength threshold, and it is not reasonable to unambiguously estimate the location of a wireless terminal as in either the Western 314-α-β-γ service area or the Eastern 314-α-β-γ service area based solely on factors (i) and (ii). However, by considering the relative signal strength of the received signals, further deductions can be made.

At location 357 in FIG. 4, the signal-strength of signal α crosses the signal-strength of signal γ. Between location 352 and location 357, the signal-strength of signals α and β is higher than the signal-strength of signal γ. Therefore, if a wireless terminal receives signals α, β, and γ above the signal-strength threshold, but the signal-strength of signals α and β is higher than the signal-strength of signal γ, then the location of the wireless terminal can be reasonably and unambiguously identified as being between location 352 and location 357 (i.e., the western portion of the Western 314-α-β-γ service area).

At location 358 in FIG. 4, the signal-strength of signal α crosses the signal-strength of signal β. Between location 358 and location 355, the signal-strength of signals α and γ is higher than the signal-strength of signal β. Therefore, if a wireless terminal receives signals α, β, and γ above the signal-strength threshold, but the signal-strength of signals α and γ is higher than the signal-strength of signal β, then the location of the wireless terminal can be reasonably and unambiguously identified as being between location 358 and location 355 (i.e., the eastern portion of the Eastern 314-α-β-γ service area).

There remains, however, non-contiguous areas—the eastern portion of the Western 314-α-β-γ service area (e.g., between location 357 and location 353) and the western portion of the Eastern 314-α-β-γ service area (e.g., between location 354 and location 358)—that cannot be disambiguated by factors (i), (ii), and (iii). In other words, if a wireless terminal receives signals α, β, and γ above the signal-strength threshold, but the signal-strength of signals β and γ is higher than the signal-strength of signal α, then the location of the wireless terminal could be in the eastern portion of the Western 314-α-β-γ service area (e.g., between location 357 and location 353) or in the western portion of the Eastern 314-α-β-γ service area. In some embodiments of the present invention, it might be acceptable for there to be non-contiguous regions that cannot be disambiguated by factors (i), (ii), and (iii).

It will be clear to those skilled in the art, after reading this disclosure, that the transmission of an additional signal (e.g., signal (δ, etc.) from only antennas 313-1 and 313-4 or only antennas 313-5 and 313-6 prevents any ambiguities using factors (i), (ii), and (iii). Therefore, it will be clear to those skilled in the art, after reading this disclosure, how to make and use alternative embodiments of the present invention that are extensions of the illustrative embodiments (i.e., use the antenna-signal combinations of the illustrative embodiments and add to them additional signals).

Although distributed-antenna system 313 comprises six antennas, it will be clear to those skilled in the art, after reading this disclosure, how to make and use alternative embodiments of the present invention that comprise any number of antennas. Furthermore, it will be clear to those skilled in the art, after reading this disclosure, how to make and use alternative embodiments of the present invention that comprise any number of distinguishable signals. And still furthermore, it will be clear to those skilled in the art, after reading this disclosure, how to make and use alternative embodiments of the present invention that assign any proper subset of the set of distinguishable signals to any proper subset of the set of antennas.

Furthermore, it will be clear to those skilled in the art, after reading this disclosure, how to make and use alternative embodiments of the present invention in which the antennas have any spatial relationship to each other, for example, as shown in FIG. 5.

Figure 6:
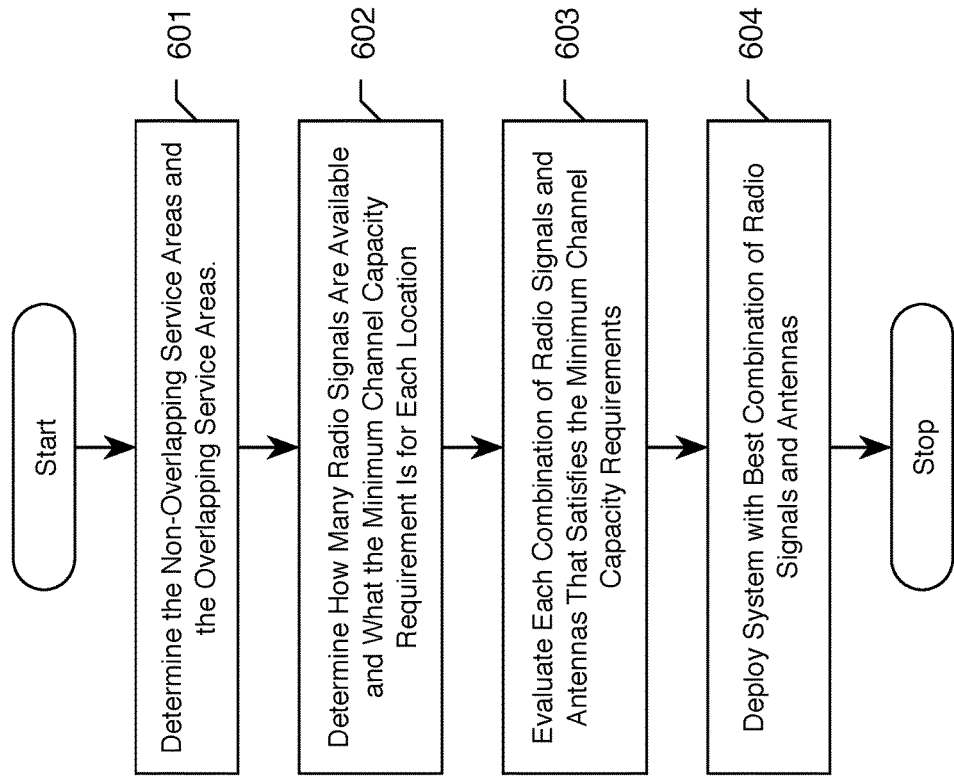
FIG. 6 depicts a flowchart of a process that can facilitate the deployment of a wireless telecommunications system in accordance the present invention.

FIG. 6 depicts a flowchart of a process that can facilitate the deployment of a wireless telecommunications system in accordance the present invention. It will be clear to those skilled in the art, after reading this disclosure, how to make and use embodiments of the present invention without using this process.

At task 601, the designer/operator of a system determines the "non-overlapping service areas" of the system, which are the locations served only by one antenna and the "overlapping service areas" of the system, which are the locations serviced by two or more antennas. These areas are determined by, for example, the geographic location of each antenna, the geographic terrain, the radio-frequency obstacles in the vicinity of the system, the type of antennas used, and the radiated signal strength of each signal from each antenna. For example, the non-overlapping service areas in system 200 are depicted in FIG. 2B and are 214-1, 214-2, 214-3, 214-4, 214-5, and 214-6. FIG. 2B also depicts the overlapping service areas for system 200, which are: 214-1-2, 214-1-3, 214-2-4, 214-3-4, 214-3-5, 214-4-6, and 214-5-6. It will be clear to those skilled in the art, after reading this disclosure, how to make and use alternative embodiments of the present invention that have any arrangement of non-overlapping service areas and overlapping service areas.

At task 602, the designer/operator of the system determines how many distinct radio signals are available to be radiated via the distributed-antenna system. For example, in system 200 there are three distinct radio signals available. It will be clear to those skilled in the art, after reading this disclosure, how to make and use embodiments of the present invention that have any number of distinct radio signals that are available for deployment.

As part of task 602, the designer/operator of the system determines the minimum service capacity requirement for each location in the system, which is based on the number of channels provided by each (downlink) signal. For example, if the minimum service capacity requirement for each location in an arrangement of non-overlapping and overlapping service signals such as depicted in FIG. 1B is six channels per location and each signal carries two channels, then all three signals—signal α and signal β and signal γ—must be radiated from each antenna, as shown in FIG. 1A, to ensure that six channels of service capacity is provided to each location.

Figure 7A:
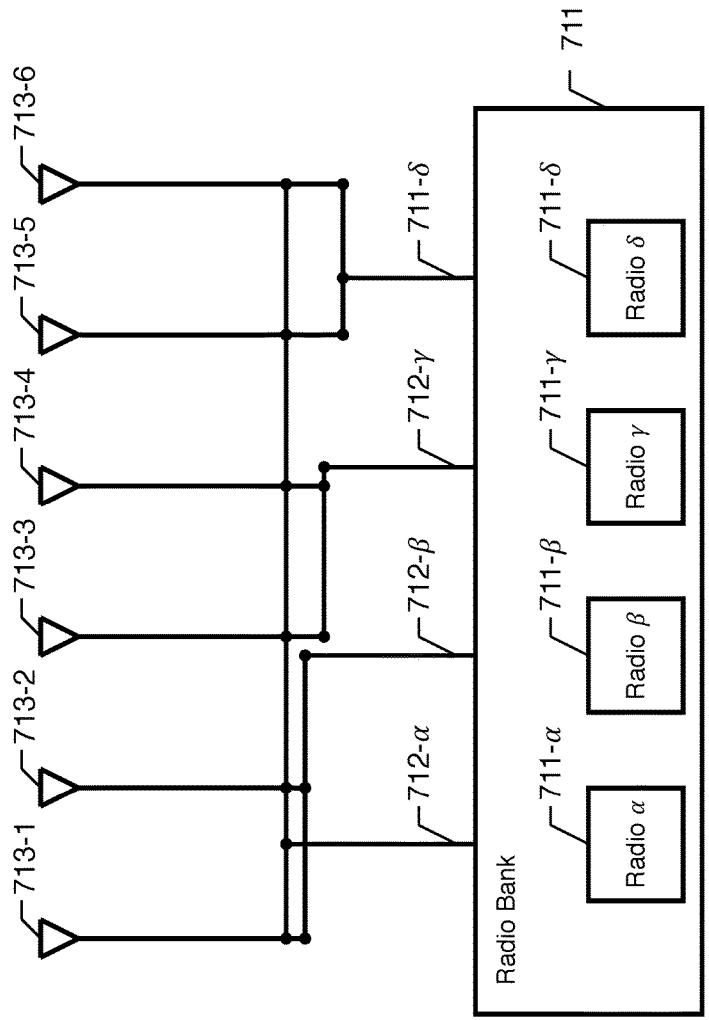
FIG. 7A depicts a schematic diagram of the salient components of wireless telecommunications system 700 in accordance with the third illustrative embodiment of the present invention.
Figure 9A:
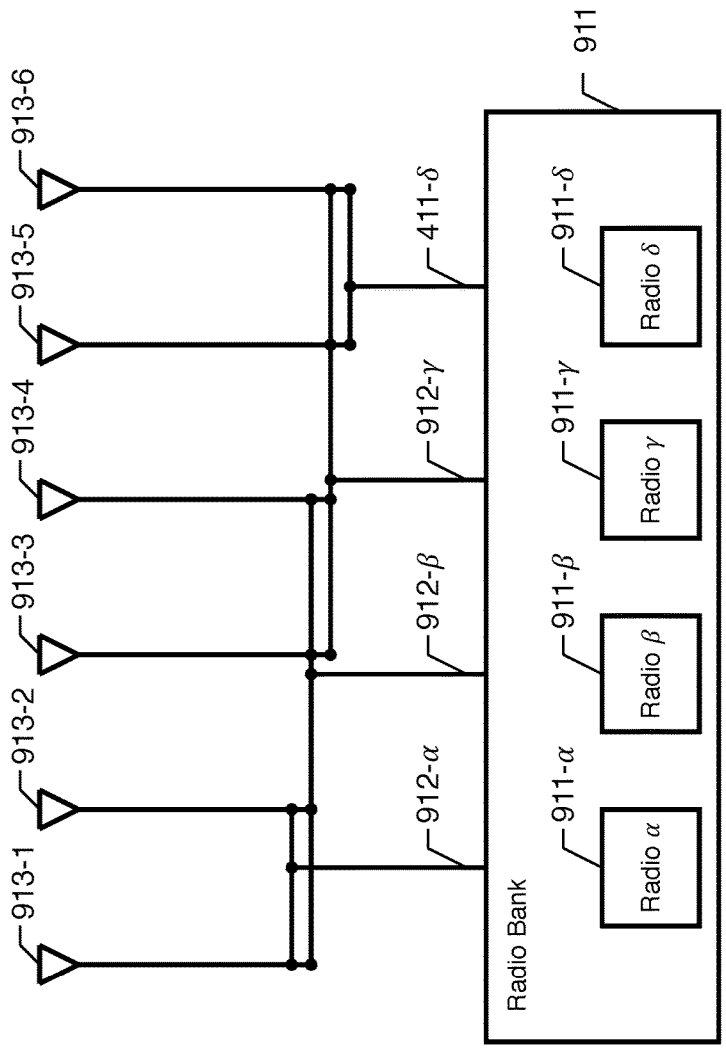
FIG. 9A depicts a schematic diagram of the salient components of wireless telecommunications system 900 in accordance with the fourth illustrative embodiment of the present invention.

In contrast, if the minimum channel capacity requirement for each location in an arrangement of non-overlapping and overlapping service signals such as depicted in FIG. 1B is four channels signals per location and each signal carries two channels, then either system 300 (as depicted in FIG. 3A) or system 700 (as depicted in FIG. 7A) or system 900 (as depicted in FIG. 9A) may be deployed.

Lastly, if the minimum channel capacity requirement for each location in an arrangement of non-overlapping and overlapping service signals such as depicted in FIG. 1B is two channels per location and each signal carries two channels, then either system 300 (as depicted in FIG. 3A) or system 200 (as depicted in FIG. 2B) or system 100 (as depicted in FIG. 1A) may be deployed.

At task 603, the designer/operator of the system evaluates the location discrimination capability of each combination of radio signals and antennas that satisfy the minimum service capacity requirement. This involves well-known combinatoric analysis and is easily performed by a computer. For example, if a distributed-antenna system comprises a antennas, s available radio signals, and the minimum service capacity requirement for each location is m radio signals per location, there are a maximum of E non-distinct possible deployments to evaluate, wherein:

$$E \leq a^{c(s,m)-1} \tag{1}$$

a equals the number of antennas, s equals the number of available distinct radio signals, m equals the minimum number of signals to satisfy the service capacity requirement for each location, and C(s,m) is the number of combinations of s choosing m at a time.

Furthermore, it will be clear to those skilled in the art that there are symmetries and other mathematical simplifications—depending on the system being analyzed—that generally make the actual number of possible deployments to evaluate substantially smaller than E. As one illustrative consideration, the designer/operator might not want the combination of signals present in one service area to equal the combination of signals present in another service area. As another illustrative consideration, the designer/operator might want the location discrimination ability of some areas to be more precise than in some other areas.

At task 604, the designer/operator deploys the telecommunications system with the combination of radio assignments to antennas that he or she decides best satisfies combination of the location discrimination and services capacity attributes for each location.

Figure 7B:
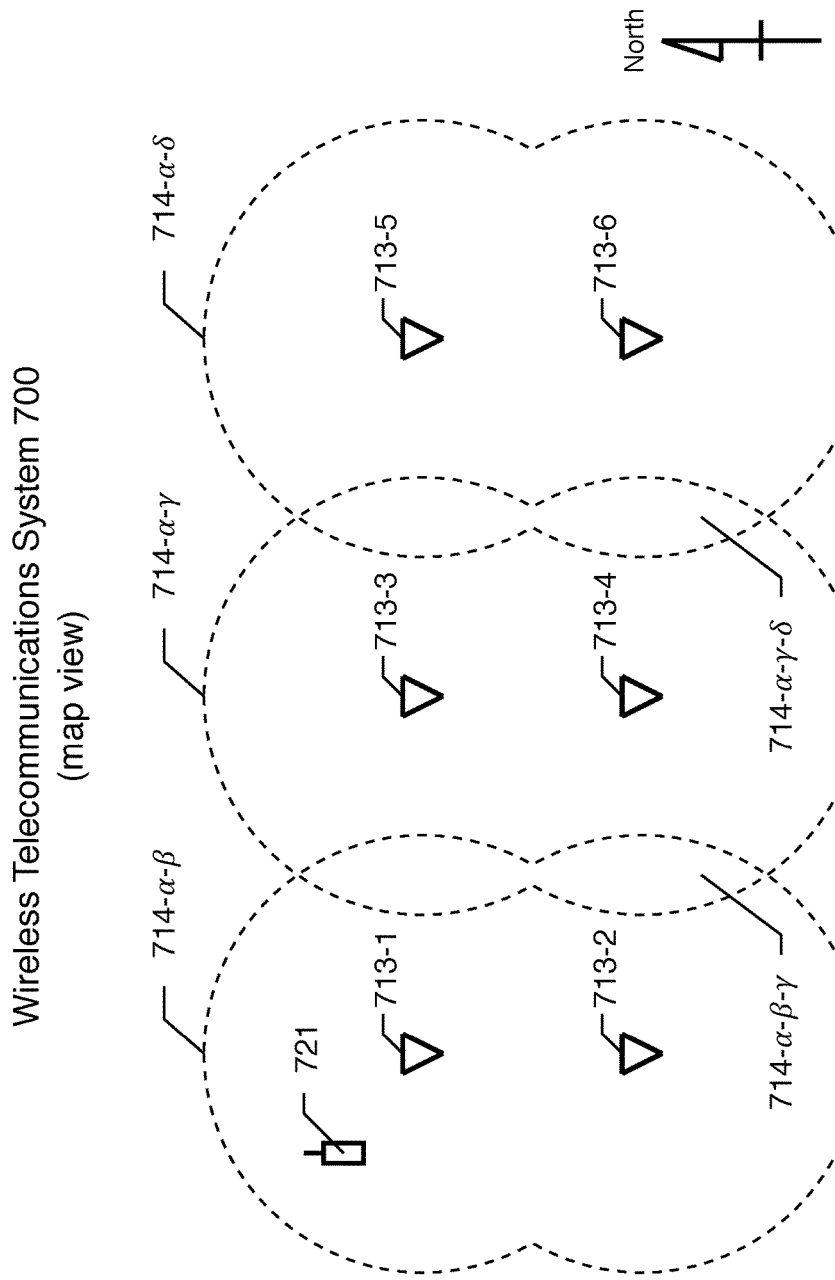
FIG. 7B depicts a map view of the service area served by each radio signal and each combination of radio signals in wireless telecommunications system 700 with respect to the location of antennas 713-1 through 713-6 and wireless terminal 721.
Figure 8:
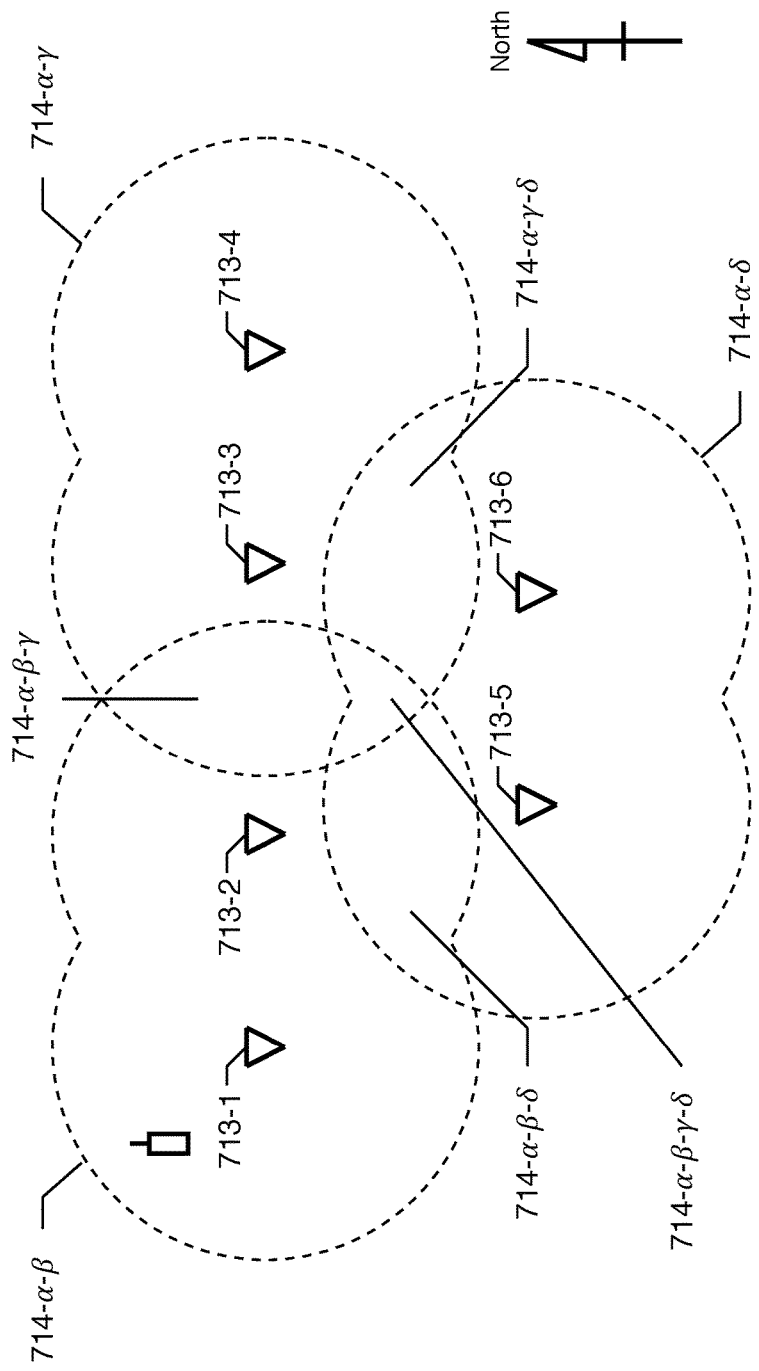
FIG. 8 depicts a map view of the service area served by each radio signal and each combination of radio signals in an alternative embodiment wireless telecommunications system 700 with respect to the location of antennas 713-1 through 713-6 and wireless terminal 721.

FIG. 7A depicts a schematic diagram of the salient components of wireless telecommunications system 700 in accordance with the third illustrative embodiment of the present invention. Wireless telecommunications system 700 provides telecommunications service to the wireless terminals (e.g., wireless terminal 721) within service area 714 (as depicted in FIGS. 7B and 8). Wireless telecommunication system comprises: radio bank 711, wireline assemblies 712-α, 712-β, 712-γ, and 712-δ, and distributed-antenna system 713.

Radio bank 711 comprises four radios, each with its own distinct hardware: radio 711-α, radio 711-β, radio 711-γ, and radio 711-δ. Radio 711-α generates modulated radio-frequency carrier signal α. Similarly, radio 711-β generates modulated radio-frequency carrier signal β, radio 711-γ generates modulated radio-frequency carrier signal γ, and radio 711-δ generates modulated radio-frequency carrier signal δ. The structure of modulated radio-frequency carrier signal α, modulated radio-frequency carrier signal β, modulated radio-frequency carrier signal γ, and modulated radio-frequency carrier signal δ is such that a wireless terminal can recognize and distinguish each signal. For example, the signals can be distinguishable by frequency (e.g., frequency-division multiplexing, etc.), time (e.g., time-division multiplexing, etc.), code (e.g., code-division multiplexing, etc.) or by radio channel. It will be clear to those skilled in the art, after reading this disclosure, how to make radio-frequency carrier signal α, radio-frequency carrier signal β, radio-frequency carrier signal γ, and radio-frequency carrier signal δ.

In some alternative embodiments of the present invention, each radio in radio bank 711 does not comprise distinct hardware but rather is a "software-defined" radio in a "block" or software-defined radio bank. In any case, it will be clear to those skilled in the art how to make and use radio 711-α, radio 711-β, radio 711-γ, and radio 711-δ.

Distributed-antenna system 713 comprises antennas 713-1 through 713-6. Each of antennas 713-1 through 713-6 is more than one wavelength of signals α, β, γ, and δ from each other (as depicted in FIGS. 7B and 8). Furthermore, the phase of the signals radiated by each of antennas 713-1 through 713-6 is uncoordinated (i.e., distributed-antenna system 713 is not a phased-array). And still furthermore, each of each of antennas 713-1 through 713-6 radiates modulated radio-frequency carrier signals α, β, γ, and δ, with the same signal strength. It will be clear to those skilled in the art how to make and use antennas 713-1 through 713-6 in antenna system 713.

Wireline assembly 712-α transports modulated radio-frequency carrier signal α from radio 711-α to antennas 713-1, 713-2, 713-3, 713-4, 713-5, and 713-6; wireline assembly 712-β transports modulated radio-frequency carrier signal β from radio 711-β to antennas 713-1 and 713-2; wireline assembly 712-γ transports modulated radio-frequency carrier signal γ from radio 711-γ to antennas 713-3 and 713-4, and wireline assembly 712-δ transports modulated radio-frequency carrier signal δ from radio 711-δ to antennas 713-5 and 713-6. It will be clear to those skilled in the art how to make and use wireline assemblies 712-α, 712-β, 712-γ, and 712-δ.

FIG. 7B depicts a map view of the service area served by each radio signal and each combination of radio signals in wireless telecommunications system 700 with respect to the location of antennas 713-1 through 713-6 and wireless terminal 721.

Signal α is radiated by all six antennas 713-1, 713-2, 713-3, 713-4, 713-5, and 713-6 and has a signal strength above a signal-strength threshold in service areas 714-α-β, 714-α-β-γ, 714-α-γ, 714-α-γ-δ, and 714-α-δ. Signal β is radiated only by antennas 713-1 and 713-2 and has a signal strength above the signal-strength threshold in service areas 714-α-β and 714-α-β-γ. Signal γ is radiated only by antennas 713-3 and 713-4 and has a signal strength above a signal-strength threshold in service areas 714-α-β-γ, 714-α-γ, and 714-α-γ-δ. Signal δ is radiated by only antennas 713-5 and 713-6 and has a signal strength above a signal-strength threshold in service areas 714-α-γ-δ and 714-α-δ. It will be clear to those skilled in the art, after reading this disclosure, how to use the three factors (i), (ii), and (iii) described above to generate an estimate of the location of a wireless terminal in service area 714.

Although distributed-antenna system 713 comprises six antennas, it will be clear to those skilled in the art, after reading this disclosure, how to make and use alternative embodiments of the present invention that comprise any number of antennas. Furthermore, it will be clear to those skilled in the art, after reading this disclosure, how to make and use alternative embodiments of the present invention that comprise any number of distinguishable signals. And still furthermore, it will be clear to those skilled in the art, after reading this disclosure, how to make and use alternative embodiments of the present invention that assign any proper subset of the set of distinguishable signals to any proper subset of the set of antennas.

Furthermore, it will be clear to those skilled in the art, after reading this disclosure, how to make and use alternative embodiments of the present invention in which the antennas have any spatial relationship to each other, for example, as shown in FIG. 8.

Figure 9B:
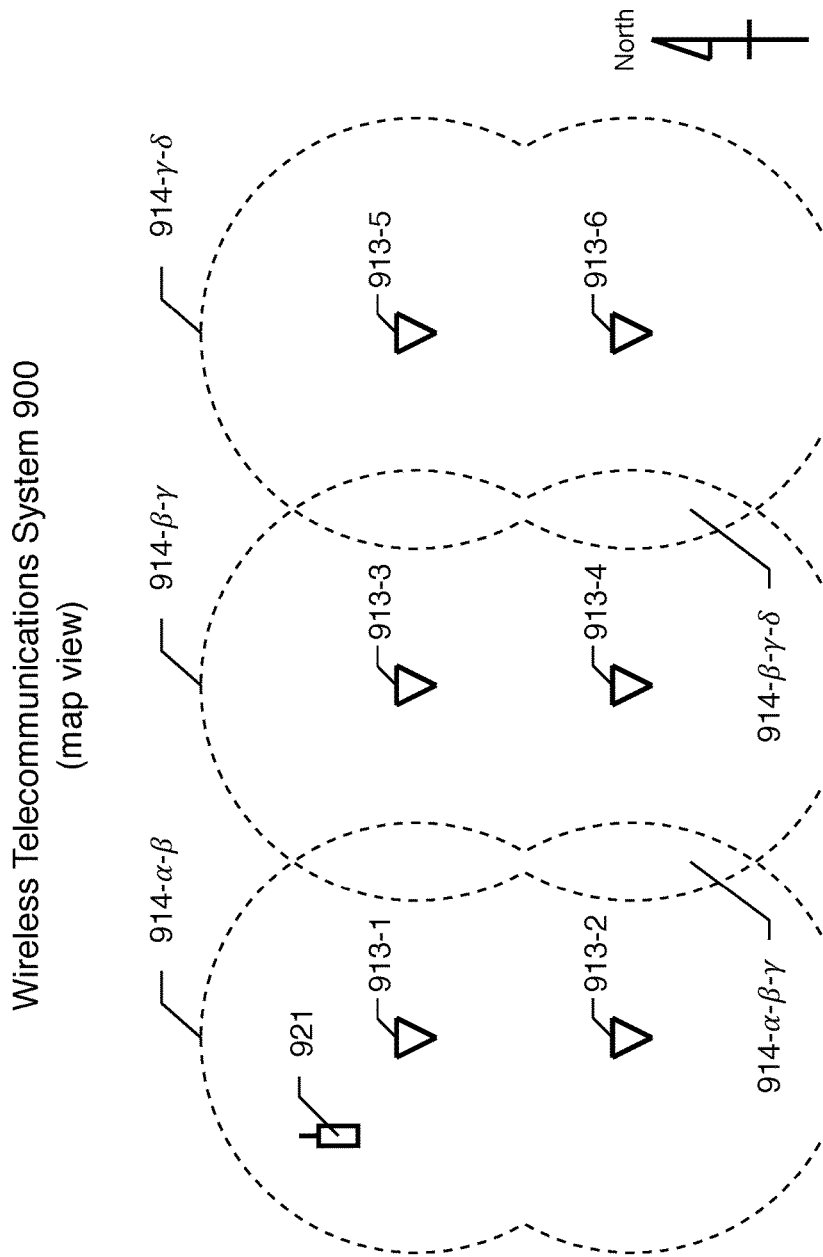
FIG. 9B depicts a map view of the service area served by each radio signal and each combination of radio signals in wireless telecommunications system 900 with respect to the location of antennas 913-1 through 913-6 and wireless terminal 921.

FIG. 9A depicts a schematic diagram of the salient components of wireless telecommunications system 900 in accordance with the fourth illustrative embodiment of the present invention. Wireless telecommunications system 900 provides telecommunications service to the wireless terminals (e.g., wireless terminal 921) within service area 914 (as depicted in FIGS. 9B and 8). Wireless telecommunication system comprises: radio bank 911, wireline assemblies 912-α, 912-β, 912-γ, and 912-δ, and distributed-antenna system 913.

Radio bank 911 comprises four radios, each with its own distinct hardware: radio 911-α, radio 911-β, radio 911-γ, and radio 911-δ. Radio 911-α generates modulated radio-frequency carrier signal α. Similarly, radio 911-β generates modulated radio-frequency carrier signal β, radio 911-γ generates modulated radio-frequency carrier signal γ, and radio 911-δ generates modulated radio-frequency carrier signal δ. The structure of modulated radio-frequency carrier signal α, modulated radio-frequency carrier signal β, modulated radio-frequency carrier signal γ, and modulated radio-frequency carrier signal δ is such that a wireless terminal can recognize and distinguish each signal. For example, the signals can be distinguishable by frequency (e.g., frequency-division multiplexing, etc.), time (e.g., time-division multiplexing, etc.), code (e.g., code-division multiplexing, etc.) or by radio channel. It will be clear to those skilled in the art, after reading this disclosure, how to make radio-frequency carrier signal α, radio-frequency carrier signal β, radio-frequency carrier signal γ, and radio-frequency carrier signal δ.

In some alternative embodiments of the present invention, each radio in radio bank 911 does not comprise distinct hardware but rather is a "software-defined" radio in a "block" or software-defined radio bank. In any case, it will be clear to those skilled in the art how to make and use radio 911-α, radio 911-β, radio 911-γ, and radio 911-δ.

Figure 10:
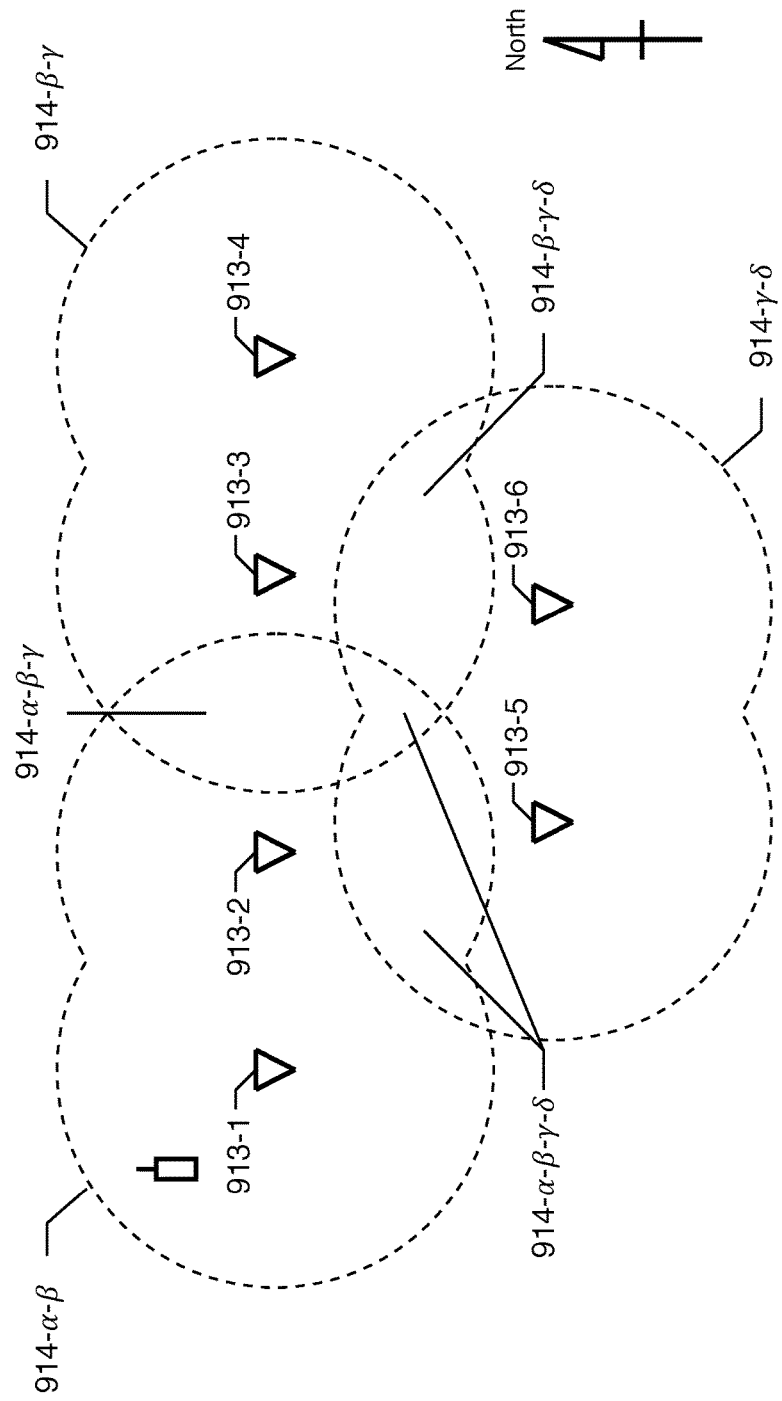
FIG. 10 depicts a map view of the service area served by each radio signal and each combination of radio signals in alternative embodiment of wireless telecommunications system 900 with respect to the location of antennas 913-1 through 913-6 and wireless terminal 921.

Distributed-antenna system 913 comprises antennas 913-1 through 913-6. Each of antennas 913-1 through 913-6 is more than one wavelength of signals α, β, γ, and δ from each other (as depicted in FIGS. 9B and 10). Furthermore, the phase of the signals radiated by each of antennas 913-1 through 913-6 is uncoordinated (i.e., distributed-antenna system 913 is not a phased-array). And still furthermore, each of each of antennas 913-1 through 913-6 radiates modulated radio-frequency carrier signals α, β, γ, and δ, with the same signal strength. It will be clear to those skilled in the art how to make and use antennas 913-1 through 913-6 in antenna system 913.

Wireline assembly 912-α transports modulated radio-frequency carrier signal α from radio 911-α to antennas 913-1 and 913-2; wireline assembly 912-β transports modulated radio-frequency carrier signal β from radio 911-β to antennas 913-1, 913-2, 913-3, and 913-4; wireline assembly 912-γ transports modulated radio-frequency carrier signal γ from radio 911-γ to antennas 913-3, 913-4, 913-5, and 913-6, and wireline assembly 912-δ transports modulated radio-frequency carrier signal δ from radio 911-δ to antennas 913-5 and 913-6. It will be clear to those skilled in the art how to make and use wireline assemblies 912-α, 912-β, 912-γ, and 912-δ.

FIG. 9B depicts a map view of the service area served by each radio signal and each combination of radio signals in wireless telecommunications system 900 with respect to the location of antennas 913-1 through 913-6 and wireless terminal 921.

Signal α is radiated by only antennas 913-1 and 913-2 and has a signal strength above a signal-strength threshold in service areas 914-α-β and 914-α-β-γ. Signal β is radiated only by antennas 913-1, 913-2, 913-3, and 913-4 and has a signal strength above the signal-strength threshold in service areas 914-α-β, 914-α-β-γ, 914-β-γ, and 914-β-γ-δ. Signal γ is radiated only by antennas 913-3, 913-4, 913-5, and 913-6 and has a signal strength above a signal-strength threshold in service areas 914-β-γ, 914-β-γ-δ, and 914-γ-δ. Signal δ is radiated by only antennas 913-5 and 913-6 and has a signal strength above a signal-strength threshold in service areas 914-β-γ-δ and 914-γ-δ. It will be clear to those skilled in the art, after reading this disclosure, how to use the three factors (i), (ii), and (iii) described above to generate an estimate of the location of a wireless terminal in service area 914.

Although distributed-antenna system 913 comprises six antennas, it will be clear to those skilled in the art, after reading this disclosure, how to make and use alternative embodiments of the present invention that comprise any number of antennas. Furthermore, it will be clear to those skilled in the art, after reading this disclosure, how to make and use alternative embodiments of the present invention that comprise any number of distinguishable signals. And still furthermore, it will be clear to those skilled in the art, after reading this disclosure, how to make and use alternative embodiments of the present invention that assign any proper subset of the set of distinguishable signals to any proper subset of the set of antennas.

Furthermore, it will be clear to those skilled in the art, after reading this disclosure, how to make and use alternative embodiments of the present invention in which the antennas have any spatial relationship to each other, for example, as shown in FIG. 10.

What is claimed is:

1. A wireless telecommunications system that employs a distributed-antenna system to provide wireless telecommunications service to a wireless terminal, the wireless telecommunications system comprising:
 a first antenna located at a first location that:
  (i) radiates a first modulated radio-frequency carrier signal, and
  (ii) radiates a second modulated radio-frequency carrier signal, and
  (iii) does not radiate a third modulated radio-frequency carrier signal;
 a second antenna located at a second location that:
  (i) does not radiate the first modulated radio-frequency carrier signal, and
  (ii) radiates the second modulated radio-frequency carrier signal, and
  (iii) radiates the third modulated radio-frequency carrier signal;
 a third antenna located at a third location that:
  (i) radiates the first modulated radio-frequency carrier signal, and
  (ii) does not radiate the second modulated radio-frequency carrier signal, and
  (iii) radiates the third modulated radio-frequency carrier signal;
 a radio bank for generating the first modulated radio-frequency carrier signal, the second modulated radio-frequency carrier signal, and the third modulated radio-frequency carrier signal, wherein:
  (i) the second modulated radio-frequency carrier signal is distinguishable by the wireless terminal from the first modulated radio-frequency carrier signal, and
  (ii) the third modulated radio-frequency carrier signal is distinguishable by the wireless terminal from the first modulated radio-frequency carrier signal, and
  (iii) the third modulated radio-frequency carrier signal is distinguishable by the wireless terminal from the second modulated radio-frequency carrier signal;
 a first wireline assembly for transporting the first modulated radio-frequency carrier signal from the radio bank to the first antenna and to the third antenna;
 a second wireline assembly for transporting the second modulated radio-frequency carrier signal from the radio bank to the first antenna and to the second antenna; and
 a third wireline assembly for transporting the third modulated radio-frequency carrier signal from the radio bank to the second antenna and to the third antenna.

2. The wireless telecommunications system of claim 1 wherein:
 (i) the second modulated radio-frequency carrier signal, as radiated by the first antenna, has a signal strength above a signal-strength threshold in a first region, and
 (ii) the second modulated radio-frequency carrier signal, as radiated by the second antenna, has a signal strength above the signal-strength threshold in a second region, and (iii) the first modulated radio-frequency carrier signal, as radiated by the third antenna, has a signal strength above a signal-strength threshold in a third region, and
(iv) the first region and the second region intersect, and
(v) the first region and the third region intersect.

3. The wireless telecommunications system of claim 1 wherein:
(i) the second modulated radio-frequency carrier signal, as radiated by the first antenna, has a signal strength above a signal-strength threshold in a first region, and
(ii) the second modulated radio-frequency carrier signal, as radiated by the second antenna, has a signal strength above the signal-strength threshold in a second region, and
(iii) the first modulated radio-frequency carrier signal, as radiated by the third antenna, has a signal strength above a signal-strength threshold in a third region, and
(iv) the first region and the second region intersect, and
(v) the first region and the third region do not intersect.

4. The wireless telecommunications system of claim 1 further comprising:
a fourth antenna located at a fourth location that:
(i) radiates the first modulated radio-frequency carrier signal, and
(ii) radiates the second modulated radio-frequency carrier signal, and
(iii) does not radiate the third modulated radio-frequency carrier signal;
a fifth antenna located at a fifth location that:
(i) does not radiate the first modulated radio-frequency carrier signal, and
(ii) radiates the second modulated radio-frequency carrier signal, and
(iii) radiates the third modulated radio-frequency carrier signal;
a sixth antenna located at a sixth location that:
(i) radiates the first modulated radio-frequency carrier signal, and
(ii) does not radiate the second modulated radio-frequency carrier signal, and
(iii) radiates the third modulated radio-frequency carrier signal;
wherein the first wireline assembly also transports the first modulated radio-frequency carrier signal from the radio bank to the fourth antenna and the sixth antenna;
wherein the second wireline assembly also transports the second modulated radio-frequency carrier signal from the radio bank to the fourth antenna and to the fifth antenna; and
wherein the third wireline assembly also transports the third modulated radio-frequency carrier signal from the radio bank to the fifth antenna and to the sixth antenna.

5. The wireless telecommunications system of claim 1 further comprising:
a fourth wireline assembly for transporting a fourth modulated radio-frequency carrier signal from the radio bank to the third antenna; and
wherein the radio bank also generates the fourth modulated radio-frequency carrier signal, wherein:
(iv) the fourth modulated radio-frequency carrier signal is distinguishable by the wireless terminal from the first modulated radio-frequency carrier signal,
(v) the fourth modulated radio-frequency carrier signal is distinguishable by the wireless terminal from the second modulated radio-frequency carrier signal, and
(vi) the fourth modulated radio-frequency carrier signal is distinguishable by the wireless terminal from the third modulated radio-frequency carrier signal.

6. A wireless telecommunications system that employs a distributed-antenna system to provide wireless telecommunications service to a wireless terminal, the wireless telecommunications system comprising:
a first antenna located at a first location that:
(i) radiates a first modulated radio-frequency carrier signal, and
(ii) radiates a second modulated radio-frequency carrier signal, and
(iii) does not radiate a third modulated radio-frequency carrier signal, and
(iv) does not radiate a fourth modulated radio-frequency carrier signal;
a second antenna located at a second location that:
(i) radiates the first modulated radio-frequency carrier signal, and
(ii) does not radiate the second modulated radio-frequency carrier signal, and
(iii) radiates the third modulated radio-frequency carrier signal, and
(iv) does not radiate a fourth modulated radio-frequency carrier signal;
a third antenna located at a third location that:
(i) radiates the first modulated radio-frequency carrier signal, and
(ii) does not radiate the second modulated radio-frequency carrier signal, and
(iii) does not radiate a third modulated radio-frequency carrier signal, and
(iv) radiates the fourth modulated radio-frequency carrier signal;
a radio bank for generating the first modulated radio-frequency carrier signal, the second modulated radio-frequency carrier signal, the third modulated radio-frequency carrier signal, and the fourth radio-frequency carrier signal, wherein:
(i) the second modulated radio-frequency carrier signal is distinguishable by the wireless terminal from the first modulated radio-frequency carrier signal,
(ii) the third modulated radio-frequency carrier signal is distinguishable by the wireless terminal from the first modulated radio-frequency carrier signal,
(iii) the third modulated radio-frequency carrier signal is distinguishable by the wireless terminal from the second modulated radio-frequency carrier signal,
(iv) the fourth modulated radio-frequency carrier signal is distinguishable by the wireless terminal from the first modulated radio-frequency carrier signal,
(v) the fourth modulated radio-frequency carrier signal is distinguishable by the wireless terminal from the second modulated radio-frequency carrier signal, and
(vi) the fourth modulated radio-frequency carrier signal is distinguishable by the wireless terminal from the third modulated radio-frequency carrier signal; and
a first wireline assembly for transporting the first modulated radio-frequency carrier signal from the radio bank to the first antenna, to the second antenna, and to the third antenna;
a second wireline assembly for transporting the second modulated radio-frequency carrier signal from the radio bank to the first antenna; and a third wireline assembly for transporting the third modulated radio-frequency carrier signal from the radio bank to the second antenna; and a fourth wireline assembly for transporting the fourth modulated radio-frequency carrier signal from the radio bank to the third antenna.

7. The wireless telecommunications system of claim 6 wherein:
(i) the first modulated radio-frequency carrier signal, as radiated by the first antenna, has a signal strength above a signal-strength threshold in a first region, and
(ii) the first modulated radio-frequency carrier signal, as radiated by the second antenna, has a signal strength above the signal-strength threshold in a second region, and
(iii) the first modulated radio-frequency carrier signal, as radiated by the third antenna, has a signal strength above a signal-strength threshold in a third region, and
(iv) the first region and the second region intersect, and
(v) the first region and the third region intersect.

8. The wireless telecommunications system of claim 6 wherein:
(i) the first modulated radio-frequency carrier signal, as radiated by the first antenna, has a signal strength above a signal-strength threshold in a first region, and
(ii) the first modulated radio-frequency carrier signal, as radiated by the second antenna, has a signal strength above the signal-strength threshold in a second region, and
(iii) the first modulated radio-frequency carrier signal, as radiated by the third antenna, has a signal strength above a signal-strength threshold in a third region, and
(iv) the first region and the second region intersect, and
(v) the first region and the third region do not intersect.

9. The wireless telecommunications system of claim 6 further comprising:
a fourth antenna located at a fourth location that:
(i) radiates the first modulated radio-frequency carrier signal, and
(ii) radiates the second modulated radio-frequency carrier signal, and
(iii) does not radiate the third modulated radio-frequency carrier signal, and
(iv) does not radiate the fourth modulated radio-frequency carrier signal;
a fifth antenna located at a fifth location that:
(i) radiates the first modulated radio-frequency carrier signal, and
(ii) does not radiate the second modulated radio-frequency carrier signal, and
(iii) radiates the third modulated radio-frequency carrier signal, and
(iv) does not radiate the fourth modulated radio-frequency carrier signal;
a sixth antenna located at a sixth location that:
(i) radiates the first modulated radio-frequency carrier signal, and
(ii) does not radiate the second modulated radio-frequency carrier signal, and
(iii) does not radiate the third modulated radio-frequency carrier signal, and
(iv) radiates the fourth modulated radio-frequency carrier signal;
wherein the first wireline assembly also transports the first modulated radio-frequency carrier signal from the radio bank to the fourth antenna, the fifth antenna, and the sixth antenna;

wherein the second wireline assembly also transports the second modulated radio-frequency carrier signal from the radio bank to the fourth antenna;
wherein the third wireline assembly also transports the third modulated radio-frequency carrier signal from the radio bank to the fifth antenna; and
wherein the fourth wireline assembly also transports the fourth modulated radio-frequency carrier signal from the radio bank to the sixth antenna.

10. A wireless telecommunications system that employs a distributed-antenna system to provide wireless telecommunications service to a wireless terminal, the wireless telecommunications system comprising:
a first antenna located at a first location that:
(i) radiates a first modulated radio-frequency carrier signal, and
(ii) radiates a second modulated radio-frequency carrier signal, and
(iii) does not radiate a third modulated radio-frequency carrier signal, and
(iv) does not radiate a fourth modulated radio-frequency carrier signal;
a second antenna located at a second location that:
(i) does not radiate the first modulated radio-frequency carrier signal, and
(ii) radiates the second modulated radio-frequency carrier signal, and
(iii) radiates the third modulated radio-frequency carrier signal, and
(iv) does not radiate the fourth radio-frequency carrier signal;
a third antenna located at a third location that:
(i) does not radiate the first modulated radio-frequency carrier signal, and
(ii) does not radiate the second modulated radio-frequency carrier signal, and
(iii) radiates the third modulated radio-frequency carrier signal, and
(iv) radiates the fourth modulated radio-frequency carrier signal;
a radio bank for generating the first modulated radio-frequency carrier signal, the second modulated radio-frequency carrier signal, the third modulated radio-frequency carrier signal, the fourth modulated radio-frequency carrier signal, and the fifth modulated radio-frequency carrier signal, wherein:
(i) the second modulated radio-frequency carrier signal is distinguishable by the wireless terminal from the first modulated radio-frequency carrier signal, and
(ii) the third modulated radio-frequency carrier signal is distinguishable by the wireless terminal from the first modulated radio-frequency carrier signal, and
(iii) the third modulated radio-frequency carrier signal is distinguishable by the wireless terminal from the second modulated radio-frequency carrier signal, and
(iv) the fourth modulated radio-frequency carrier signal is distinguishable by the wireless terminal from the first modulated radio-frequency carrier signal, and
(v) the fourth modulated radio-frequency carrier signal is distinguishable by the wireless terminal from the second modulated radio-frequency carrier signal, and
(vi) the fourth modulated radio-frequency carrier signal is distinguishable by the wireless terminal from the third modulated radio-frequency carrier signal; and a first wireline assembly for transporting the first modulated radio-frequency carrier signal from the radio bank to the first antenna;

a second wireline assembly for transporting the second modulated radio-frequency carrier signal from the radio bank to the first antenna and to the second antenna;

a third wireline assembly for transporting the third modulated radio-frequency carrier signal from the radio bank to the second antenna and to the third antenna; and a fourth wireline assembly for transporting the fourth modulated radio-frequency carrier signal from the radio bank to the fourth antenna.

11. The wireless telecommunications system of claim 10 wherein:
  (i) the second modulated radio-frequency carrier signal, as radiated by the first antenna, has a signal strength above a signal-strength threshold in a first region, and
  (ii) the second modulated radio-frequency carrier signal, as radiated by the second antenna, has a signal strength above the signal-strength threshold in a second region, and
  (iii) the third modulated radio-frequency carrier signal, as radiated by the second antenna, has a signal strength above a signal-strength threshold in a third region, and
  (iv) the third modulated radio-frequency carrier signal, as radiated by the third antenna, has a signal strength above a signal-strength threshold in a fourth region, and
  (v) the first region and the second region intersect, and
  (vi) the third region and the fourth region intersect.

12. The wireless telecommunications system of claim 10 wherein:
  (i) the first modulated radio-frequency carrier signal, as radiated by the first antenna, has a signal strength above a signal-strength threshold in a first region, and
  (ii) the fourth modulated radio-frequency carrier signal, as radiated by the third antenna, has a signal strength above the signal-strength threshold in a second region, and
  (iii) the first region and the second region do not intersect.

13. The wireless telecommunications system of claim 10 further comprising:

a fourth antenna located at a fourth location that:
  (i) radiates the first modulated radio-frequency carrier signal, and
  (ii) radiates the second modulated radio-frequency carrier signal, and
  (iii) does not radiate the third modulated radio-frequency carrier signal, and
  (iv) does not radiate the fourth modulated radio-frequency carrier signal;

a fifth antenna located at a fifth location that:
  (i) does not radiate the first modulated radio-frequency carrier signal, and
  (ii) radiates the second modulated radio-frequency carrier signal, and
  (iii) radiates the third modulated radio-frequency carrier signal, and
  (iv) does not radiate the fourth radio-frequency carrier signal;

a sixth antenna located at a sixth location that:
  (i) does not radiate the first modulated radio-frequency carrier signal, and
  (ii) does not radiate the second modulated radio-frequency carrier signal, and
  (iii) radiates the third modulated radio-frequency carrier signal, and
  (iv) radiates the fourth modulated radio-frequency carrier signal;

wherein the first wireline assembly also transports the first modulated radio-frequency carrier signal from the radio bank to the fourth antenna, the fifth antenna, and the sixth antenna;

wherein the second wireline assembly also transports the second modulated radio-frequency carrier signal from the radio bank to the fourth antenna;

wherein the third wireline assembly also transports the third modulated radio-frequency carrier signal from the radio bank to the fifth antenna; and wherein the fourth wireline assembly also transports the fourth modulated radio-frequency carrier signal from the radio bank to the sixth antenna.

\* \* \* \* \*